United States Patent [19]
Fujita et al.

[11] Patent Number: 5,140,849
[45] Date of Patent: Aug. 25, 1992

[54] ROLLING BEARING WITH A SENSOR UNIT

[75] Inventors: Kiyoshi Fujita, Toride; Tsutomu Yuine, Ushiku, both of Japan

[73] Assignees: Agency of Industrial Science and Technology; Koyo Seiko Kabushiki Kaisha, both of Japan

[21] Appl. No.: 559,837

[22] Filed: Jul. 30, 1990

[51] Int. Cl.$^5$ .................................. G01N 13/04
[52] U.S. Cl. .................. 73/118.1; 73/862.54
[58] Field of Search ............ 73/593, 118.1, 660, 73/866.5, 862.54, 775; 384/448; 324/173, 174

[56] References Cited

U.S. PATENT DOCUMENTS

| | | | |
|---|---|---|---|
| 3,088,083 | 4/1963 | Ward | 73/775 |
| 3,137,834 | 6/1964 | Pfann | 73/775 |
| 4,145,930 | 3/1979 | Hildebrandt et al. | 73/593 |
| 4,203,319 | 5/1980 | Lechler | 73/862.54 |
| 4,341,122 | 7/1982 | Lechler et al. | 73/862.54 |
| 4,793,189 | 12/1988 | Dell'Orto et al. | 73/775 |
| 5,038,616 | 8/1991 | Schneider et al. | 73/660 |

*Primary Examiner*—Hezron E. Williams
*Assistant Examiner*—Rose M. Finley
*Attorney, Agent, or Firm*—Bruce L. Adams; Van C. Wilks

[57] ABSTRACT

A rolling bearing has a sensor unit disposed on one of the opposite circumferential surfaces of a fixed ring of the bearing. The sensor unit includes two strain gauges disposed on the circumferential surface of the fixed ring, one strain gauge extending in the circumferential direction fo the fixed ring and the other strain gauge extending in the axial direction of the fixed ring. Preferably the strain gauges are arranged to overlap with each other and to cross at right angles or obliquely to each other. A plurality of performance characteristics of the bearing are detected on the basis of output signals from the two strain gauges. The detection of the performance characteristics enables the rolling bearing to be monitored during operation with respect to applied load, the rotational speed and acceleration of a rolling ring thereof, a rise in temperature thereof and an abnormal vibration thereof.

45 Claims, 10 Drawing Sheets

CIRCUMFERENTIAL DIRECTION

FIG. 3(b)

CIRCUMFERENTIAL DIRECTION

ROLLING BEARING WITH A SENSOR UNIT

FIELD OF THE INVENTION

The present invention relates to a rolling bearing and more particularly to a rolling bearing provided with a sensor unit that is connected to means for checking the rolling bearing during operation with respect to a load applied to the bearing, a rise in temperature of the bearing, the rotational speed and acceleration of a rolling ring in the bearing and an abnormal vibration of the bearing.

BACKGROUND OF THE INVENTION

In conventional rolling bearings, their operating state has been checked with one or two temperature sensors, a rotational speed sensor and a sensor for sensing an abnormal vibration. These sensors are attached to a member disposed near the rolling bearing or to a fixed ring composed of the bearing. Also, detection of a load applied to the rolling bearing during operation has conventionally been inadequate. For example, a rolling bearing disclosed in U.S. Pat. No. 4,145,930 issued Mar. 27, 1979, is provided with two pairs of strain gauges (1, 2; 3, 4) arranged on and along one of the opposite side surfaces of a fixed ring (9) for sensing the rotating speed of a rolling ring (5) in the bearing (8). However, this prior bearing is not provided with any one of the above-mentioned sensors or detectors other than the rotating speed sensor.

Accordingly, in operation of such prior bearings, the bearings are prone to overheating or seizing-up because they have no means for sensing beforehand an abnormal increase in the load applied to them. Also, it is difficult to know in advance that the bearing has been considerably flaked due to its rolling contact fatigue and is thus approaching the end of its fatigue life. In addition, if the bearing is provided with a conventional set of load indicator, rotational speedometer, vibrometer, thermometer and the like for checking performance characteristics of the bearing, such a set of detectors requires a relatively large space for its arrangement and is also high in cost.

SUMMARY OF THE INVENTION

It is an object of the present invention to alleviate the drawbacks as noted above with respect to the conventional rolling bearings.

According to the present invention, there is provided a rolling bearing comprising a rolling ring; a fixed ring disposed to coaxially radially overlap the rolling ring with an annular space therebetween; rolling elements rotatably inserted into the annular space between the rolling ring and the fixed ring; a sensor unit disposed on and within one of the opposite circumferential surfaces of the fixed ring and the sensor unit also includes first and second strain gauges which are fixedly disposed on the circumferential surface of the fixed ring and are electrically connected to detecting means for detecting a plurality of performance characteristics of the rolling bearing on the basis of output signals from the first and second strain gauges. The first and second strain gauges are arranged to extend in the circumferential direction of and the axial direction of the fixed ring, respectively.

Preferably the detecting means includes a bridge circuit and five sensing means for sensing five performance characteristics of the rolling bearing. That is, the bridge circuit is composed of the first and second strain gauges as two mutually adjacent arms of the bridge circuit and of first and second resistors as two other mutually adjacent arms of the bridge circuit. The bridge circuit has two input terminals, one of which is connected to the first and second strain gauges and the other one is connected to the first and second resistors. The bridge circuit also has two output terminals, one of which is connected to the first strain gauge and the first resistor and the other one is connected to the second strain gauge and the second resistor. The two input terminals are connected to the two output terminals of a voltage source. The five sensing means comprises a first means for sensing a peak-to-peak amplitude of a first output signal formed between the two output terminals of the bridge circuit; a second means for sensing the frequency of the first output signal from the bridge circuit; a third means for sensing the rate of change of the frequency sensed in the second means; a fourth means for sensing the level of high frequency component of the first output signal from the bridge circuit; and a fifth means for sensing the level of a second output signal formed between the input terminal connected to the first and second strain gauges and the output terminal connected to the second strain gauge and the second resistor in the bridge circuit.

Further, the first and second strain gauges are preferably arranged to overlap with each other and to cross at angles equal to or near 90 degrees to each other.

As described in detail hereinafter, the inventive rolling bearing is effectively used for checking a plurality of performance characteristics thereof such as a rise in temperature of the bearing, a load applied to the bearing, the rotational speed and acceleration of the rolling ring in the bearing and an abnormal vibration of the bearing, and thereby prevented from failure such as the seizing-up of the bearing.

DESCRIPTION OF THE PREFERRED EMBODIMENTS

Figure 1:
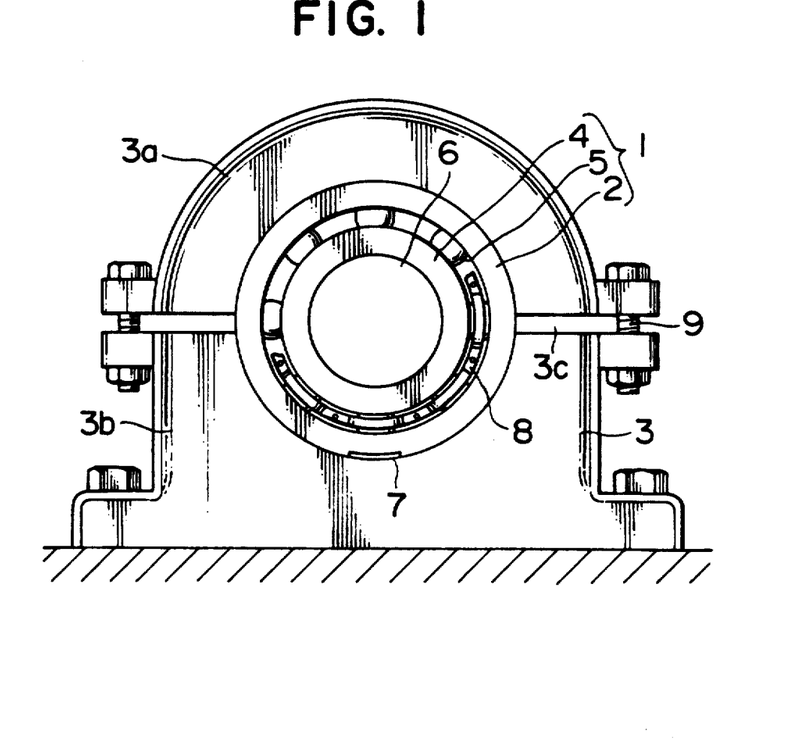
FIG. 1 is a front view of a rolling bearing according to the invention.
Figure 2:
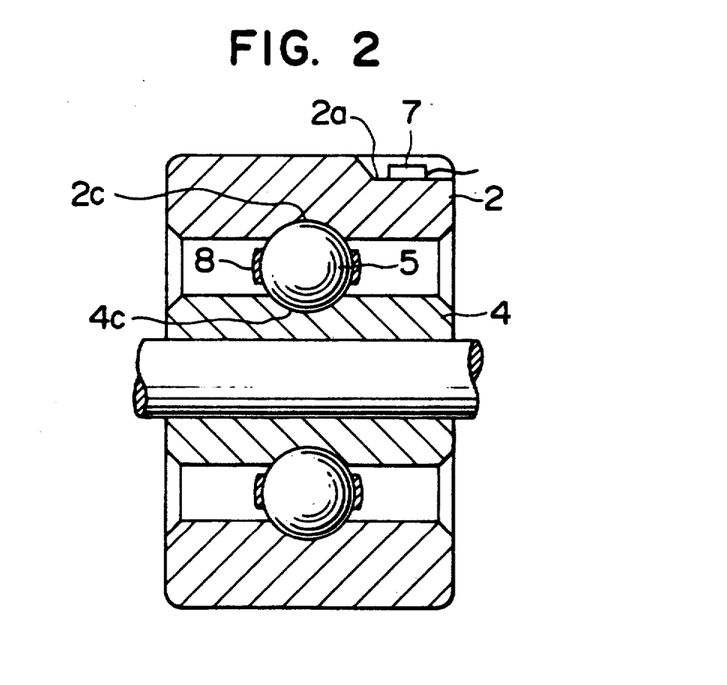
FIG. 2 is a vertical cross-sectional view of the first embodiment of a rolling bearing provided with strain gauges according to the invention.
Figure 3A:
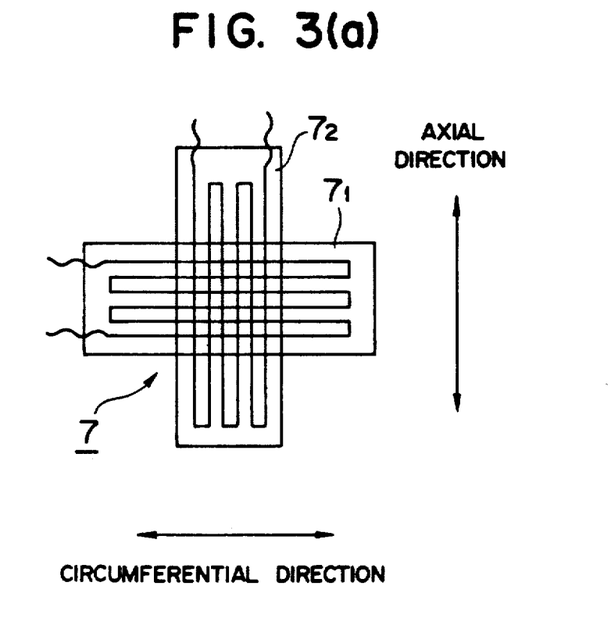
FIGS. 3(a), 3(b) and 3(c) are plan views showing the respective mutual arrangements of two strain gauges according to the invention.
Figure 3B:
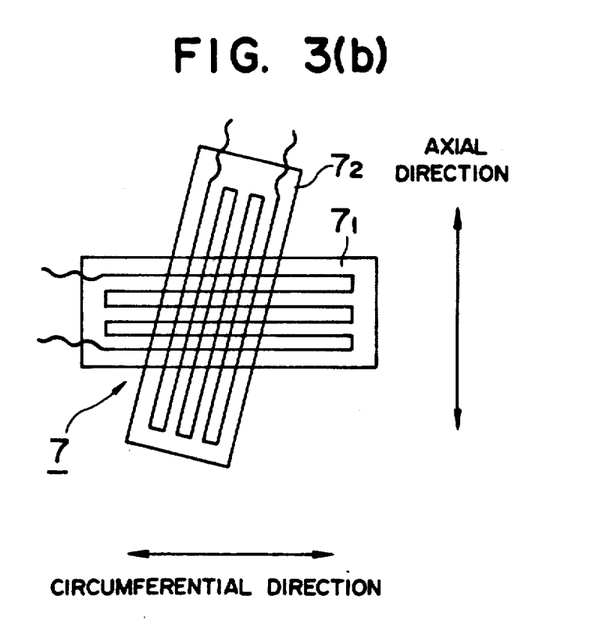
Figure 3C:
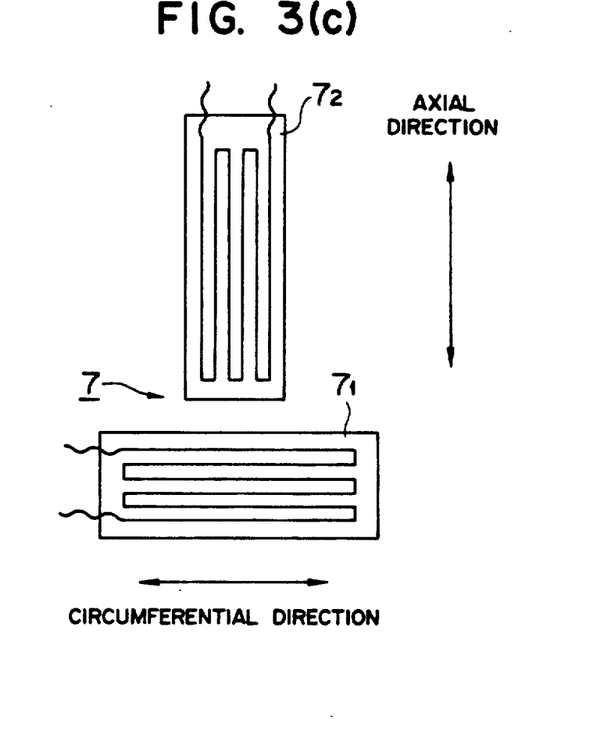

FIGS. 1 and 2 show the first embodiment of a rolling bearing according to the invention. The numeral 1 designates generally the rolling bearing, that bearing includes an outer ring 2, inner ring 4 and a plurality of balls 5 which are rotatably inserted into an annular space formed between the outer and inner rings and held at circumferentially equal intervals by a cage 8. Raceway tracks 2c and 4c for the balls 5 are formed facing with each other in the inner circumferential surface of the outer ring 2 and in the outer circumferential surface of the inner ring 4, respectively. The cage 8 is partially notched to thereby enable the balls 5 to be seen. The outer ring 2 is fixedly interposed, as a fixed ring, between upper and lower housings 3a and 3b, which are separated from each other, of a bearing housing 3. The upper and lower housings 3a and 3b are overlapped with each other through a spacer 3c interposed therebetween and fixed with each other by clamping bolts 9. The inner ring 4 has a shaft 6 coaxially inserted thereinto. A notched portion 2a is formed in one of the opposite corners of the outer circumferential surface of the outer ring 2 to extend parallel to the axis of the outer ring, and sensing means including strain gauges 7 are pasted on the notched portion. As shown in FIG. 3(a), the strain gauges 7 comprise a first strain gauge $7_1$ extending in the circumferential direction of the outer ring 2 and a second strain gauge $7_2$ extending in the axial direction of the outer ring. It is most preferable for effective detection of performance characteristics of the rolling bearing that the first and second strain gauges $7_1$ and $7_2$ are overlapped with each other and cross at right angles to each other. To the extent that as there is no practical difficulty in effective detection of the above characteristics, the strain gauges $7_1$ and $7_2$ are allowable to be arranged to cross obliquely to each other, as shown in FIG. 3(b). Also, when the strain gauges $7_1$ and $7_2$ are disposed in a region in which the mechanical influence of rotation of the inner ring 4 on the outer ring 2 is relatively uniform, it is allowable to arrange the strain gauges without mutual overlapping, as shown in FIG. 3(c). In this case, the strain gauges $7_1$ and $7_2$ are arranged in a line in the axial direction of the outer ring 2 (see FIG. 3(c)). It is also allowable to arrange these strain gauges in a line in the circumferential direction of the outer ring 2 without mutual overlapping. Generally the strain gauges 7 are pasted on the notched portion with a binder of epoxy resin so that one of the first and second strain gauges $7_1$ and $7_2$ extends parallel to the axis of the outer ring 2.

Figure 4:
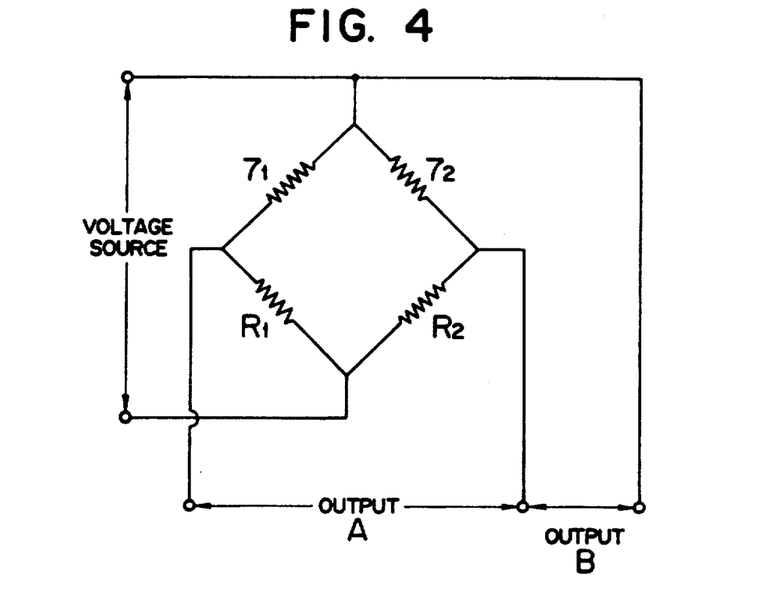
FIG. 4 is a circuit diagram of a bridge circuit used in a preferred embodiment of the invention.

Referring to FIG. 4, the first and second strain gauges $7_1$ and $7_2$ constitute a bridge circuit through their leaders together with first and second resistors $R_1$ and $R_2$, where the first and second strain gauges form the two mutually adjacent arms of the bridge circuit and the first and second resistors form the other two mutually adjacent arms of the bridge circuit. As shown in FIG. 4, the bridge circuit has two input terminals the one of which is connected to the first and second strain gauges $7_1$ and $7_2$ and the other one is connected to the first and second resistors $R_1$ and $R_2$. The bridge circuit also has two output terminals the one of which is connected to the first strain gauge $7_1$ and the first resistor $R_1$ and the other one is connected to the second strain gauge $7_2$ and the second resistor $R_2$. The two input terminals are connected to two output terminals of a voltage source. The bridge circuit generates a first output signal or voltage A between the two output terminals and a second output signal or voltage B between the input terminal connected to the first and second strain gauges $7_1$ and $7_2$ and the output terminal connected to the second strain gauge $7_2$ and the second resistor $R_2$. The first and second output signals A and B are inputted to terminals C and D, respectively, of determining means including a signal processing system as shown in FIG. 5.

As obviously understood from the foregoing, the first output signal A is formed due to a radial strain that is caused in the outer ring 2 whenever the balls 5 runs near the strain gauges 7. Accordingly, the amplitude and frequency of the output signal A include information of a load applied to the outer ring 2 and of a rotational speed of the inner ring 4, respectively. In this case, the signal A is scarcely dependent on temperature, because the first and second strain gauges $7_1$ and $7_2$ are always at a same temperature and consequently their temperature strains offset each other in the bridge circuit. On the other hand, the second output signal B is corresponding to a terminal voltage of the second strain gauge $7_2$. Because the second strain gauge $7_2$ is disposed to extend in the axial direction of the outer ring 2, the signal B is scarcely dependent on the mechanical radial strain of the outer ring 2 but is sensitive to temperature strain of the outer ring; that is, the signal B includes information regarding temperature of the outer ring 2.

Figure 5:
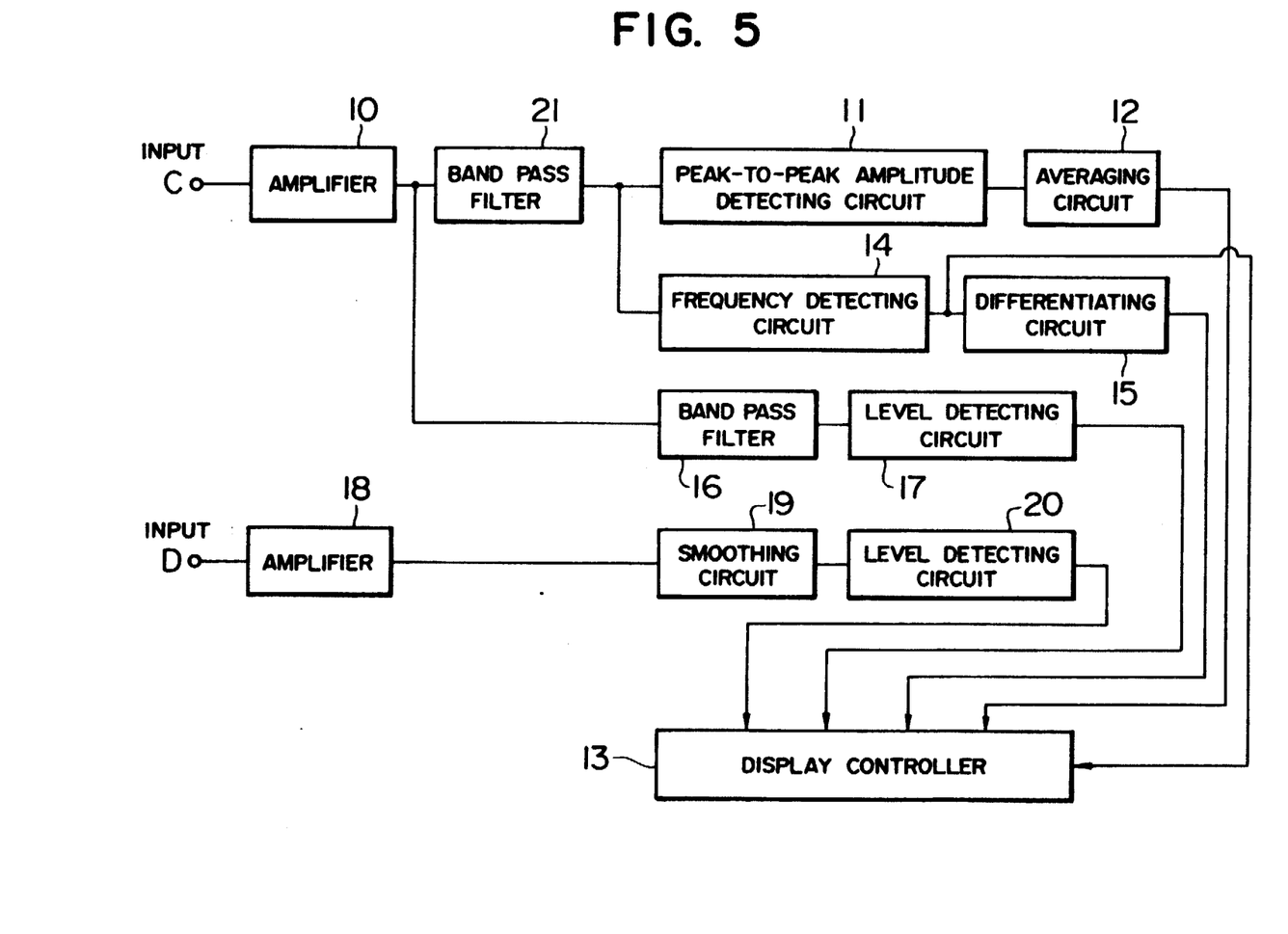
FIG. 5 is a block diagram of a signal processing system connected to the bridge circuit shown in FIG. 4.

Referring to FIG. 5, determining means of the present invention is shown. The first output signal A fed from the bridge circuit to the input terminal C is amplified by an amplifier 10 and then separated to third and fourth signals. The third signal is treated with a band-pass filter 21 and fed to a circuit 11 for detecting a peak-to-peak amplitude and the amplitude thus detected is inputted to a display controller 13 through an averaging circuit 12. Also, the third signal treated with the band-pass filter 21 is fed to a frequency-detecting circuit 14 and the frequency thus detected is inputted, on the one hand, directly to and, on the other hand, through a differentiating circuit 15 to the display controller 13. The fourth signal is fed to a level-detecting circuit 17 through another band-pass filter 16 and the signal level thus detected is inputted to the display controller 13. On the other hand, the second output signal B fed from the bridge circuit to the input terminal D is supplied to the display controller 13 through another amplifier 18, a smoothing circuit 19 and another level-detecting circuit 20.

The output signal from the circuit 11 for detecting a peak-to-peak amplitude has been formed to have a low frequency component only. This output signal is corresponding to an amplitude of repeated radial strain of the outer ring 2, that is, corresponding to a load applied to the rolling bearing 1 during operation. The output signal is averaged by passing it through the averaging circuit 12 because it fluctuates with time, and then it is displayed as said load in the display controller 13. Preferably an alarm is provided with the display controller 13 for warning of an abnormality in not only said load but also the other performance characteristics of the rolling bearing. Also, an output signal from the frequency-detecting circuit 14 is corresponding to the number of the balls 5 passing near the first strain gauge $7_1$ per unit time. Consequently, this signal shows the rotational speed of the inner ring 4 and its differentiating signal means the rotational acceleration of the inner ring. Further, an output signal from the level-detecting circuit 17 is corresponding to a high frequency vibration of the ball bearing 1 because the band-pass filter 16 selectively outputs a high frequency component of the output signal A, and consequently any abnormal vibration of the ball bearing can be detected.

The second output signal B includes not only the temperature information of but also an information of vibration of the ball bearing 1. Accordingly, after this signal B has been smoothed with the smoothing circuit 19, it is displayed as the temperature of the ball bearing 1. However, if the level-detecting circuit 20 or the display controller 13 has a relatively slow responsibility, such smoothing process may be omitted.

Although a direct current is used as the voltage source for the bridge circuit in the above embodiments, an alternating current is also usable, accompanied with its synchronous commutation.

According to the invention, instead of the outer ring 2 being fixed, the inner ring 4 can be used as a fixed ring, wherein the strain gauges 7 are preferably disposed on the circumferential surface, opposite to the one having the raceway track 4c, of the inner ring. Also, the invention is carried out with respect to a roller bearing or a thrust bearing. As for the strain gauges 7, while they are disposed on the notched portion 2a of the outer ring 2 in the above-described embodiment, they are also allowable to be directly embedded in or pasted on one of the circumferential surfaces of the outer ring 2. In such case, a dent for housing the strain gauges 7 therein is formed in a portion opposed to the strain gauges of the bearing housing 3 or the shaft 6 so that the strain gauges are not contacted with the housing or the shaft.

In carrying out the invention, the above-mentioned detecting means are selectively operated so that an operator can obtain necessary informations about the load, rotational speed and acceleration, abnormal vibration and temperature of the rolling bearing. Preferably the detecting means are controlled with a microcomputer.

The inventive rolling bearing provided with the above-mentioned detecting means exhibits the following functions or actions: The first strain gauge $7_1$ extending in the circumferential direction of the outer ring 2 behaves so as to periodically change its electric resistence in response to a radical strain which is caused in the outer ring whenever the rolling elements (such as the balls 5 or rollers) pass near the the first strain gauge, whereas the resistance of the second strain gauge $7_2$ extending in the axial direction of the outer ring changes only slightly in response to the radial strain. As the result, the first output signal A from the bridge circuit pulsates in response to the radial strain (if the voltage source of the bridge circuit is of an AC type, the signal A comprises an amplitude-modulated voltage). The peak-to-peak amplitude of this pulsating output signal A behaves as a function of a load applied to the rolling bearing, and accordingly the load can be detected. Also, the frequency of the signal A is proportional to the number of the rolling elements 5 passing near the first strain gauge $7_1$ per unit time and consequently it represents the rotational speed of the inner ring 4. Accordingly, the rate of change in the frequency shows the rotational acceleration of the inner ring 4. The high frequency components of the output signal from the band-pass filter 16 are due to a vibration higher than the vibration (fundamental frequency component) due to the normal rotation of the rolling elements 5, and accordingly any abnormal vibration of the rolling bearing can be detected through the level-detecting circuit 17 and the display controller 13. The resistance of the first and second strain gauges $7_1$ and $7_2$ are also changed with temperature, but the first output signal A is scarcely dependent on the temperature of the strain gauges because of such resistance changes with temperature being offset in the bridge circuit. The temperature or its relative change of the rolling bearing is detected from the second output signal B depending only on the resistance of the second strain gauge $7_2$.

As described above, the invention enables an operator to simultaneously detect a load applied to the bearing, the rotational speed and acceleration of a rolling ring of the bearing and an abnormal vibration of the bearing as well as the temperature of the bearing. Accordingly, the operator can recognize the operating state of the rolling bearing and easily perceive whether the bearing is approaching the end of its fatigue life. In addition, the inventive rolling bearing does not need a high production cost because it is provided only with a pair of strain gauges connected to the aforementioned detecting means.

Figure 6:
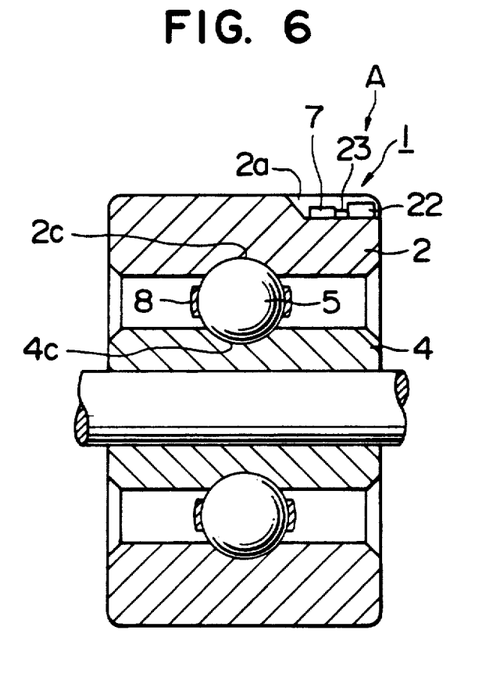
FIG. 6 is a vertical cross-sectional view of the second embodiment of the rolling bearing according to the invention.
Figure 7:
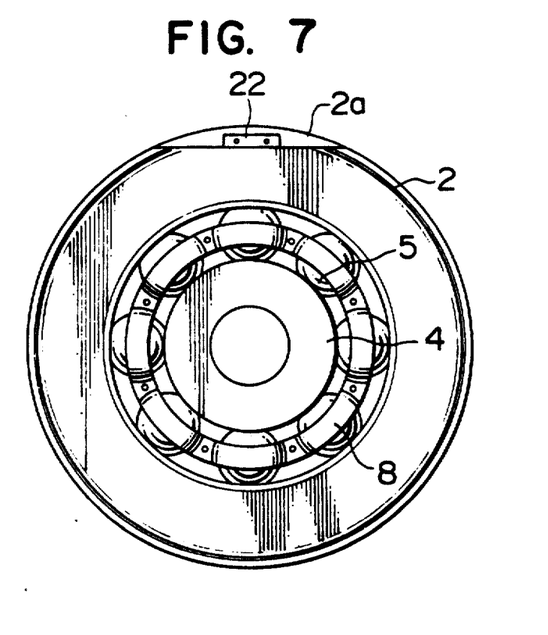
FIG. 7 is a side view of the rolling bearing shown in FIG. 6.
Figure 8:
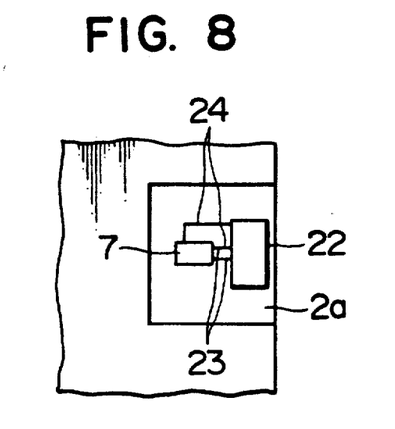
FIG. 8 is an enlarged plan view in the direction of the arrow A in FIG. 7.

FIGS. 6 to 8 show the second embodiment of the installation structure of a pair of strain gauges 7 according to the invention. Referring to these drawings, a notched portion 2a having a flat bottom is formed in the corner outside the raceway track 2c of the outer circumferential surface of the outer ring 2, and a sensor unit comprising the strain gauges 7 and a plug socket 22 connected to the strain gauges is fixedly pasted on the flat bottom. In this case, two pairs 23 and 24 leaders from the first and second strain gauges $7_1$ and $7_2$ of the strain gauges 7 are lined up in four rows in one direction and connected to the plug socket 22. According to this second embodiment, the sensor unit is easily removably connected to the aforementioned detecting means through the plug socket. Also, it can compactly be disposed within the notched portion 2a because of the four leaders are lined up between the strain gauges 7 and the plug socket 22.

Figure 9:
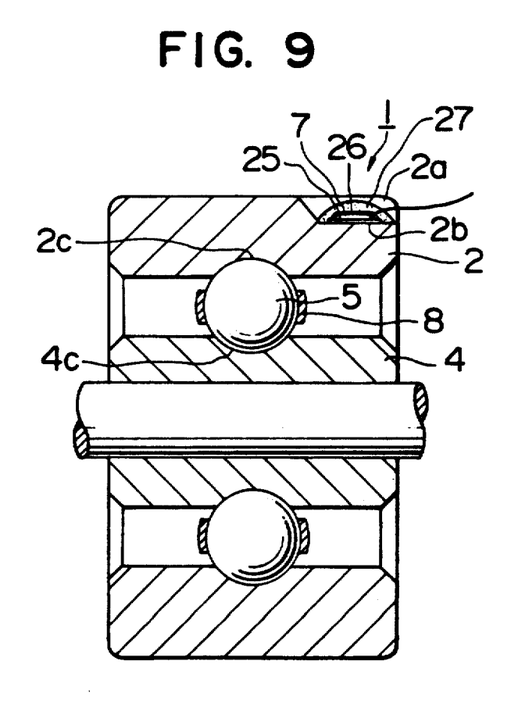
FIG. 9 is a vertical cross-sectional view of the third embodiment of the rolling bearing according to the invention.
Figure 10:
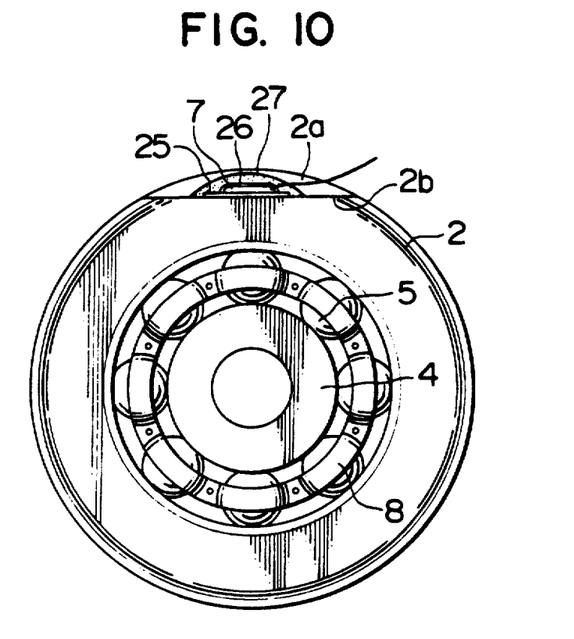
FIG. 10 is a side view of the rolling bearing shown in FIG. 9.

FIGS. 9 and 10 show the third embodiment of a pair of strain gauges 7. Referring to these drawings, a notched portion 2a is formed in the outer circumferential surface of the outer ring 2, and an insulating layer 25 composed of a ceramic material is formed on the bottom 2b of the notched portion 2a. The strain gauges 7 are fixedly disposed on the insulating layer 25 and covered with another insulating layer 26 of ceramics. Further, the insulating layer 26 is fixedly covered with a protecting layer 27 that is formed by spattering silver or copper on the layer 26 in a vacuum deposition process. According to this third embodiment, the rolling bearing can be effectively used even in a vacuum detecting its performance characteristics because the strain gauges are surrounded with the ceramic layers 25 and 26, whereas the rolling bearing according to the first embodiment tends to undesirably discharge gas from the organic adhesive used for pasting the strain gauges on the outer ring 2 when the rolling bearing is used in vacuum.

Figure 11:
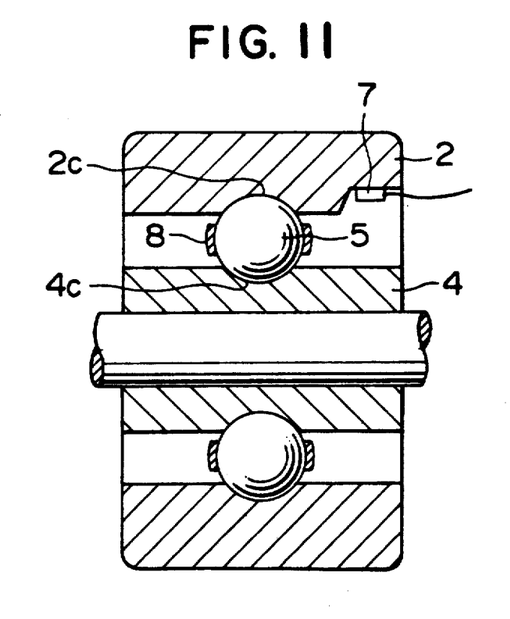
FIG. 11 is a vertical cross-sectional view of the fourth embodiment of the rolling bearing according to the invention.

Further, FIG. 11 shows the fourth embodiment of the invention, wherein the strain gauges 7 are pasted on a notched portion apart from the raceway track 2c of the inner circumferential surface of the outer ring 2. If instead of the outer ring 2 the inner ring 4 is used as a fixed ring, the strain gauges 7 are also allowable to be pasted on a notched portion apart from the raceway track 4c of the outer circumferential surface of the inner ring 4.

Next, the inventors describe hereinafter the results of experiments carried out with respect to a rolling bearing according to the invention. As the rolling bearing, a deep groove ball bearing was used that is defined by the bearing number 6206 in the Japanese Industrial Standards. The rolling bearing was provided with a notched portion 2a formed in the corner, outside a raceway track for balls, of the outer circumferential surface of an outer ring, and first and second strain gauges $7_1$ and $7_2$ were disposed on the notched portion so that the first and second strain gauges overlap with each other and cross at right angles to each other.

Figure 12:
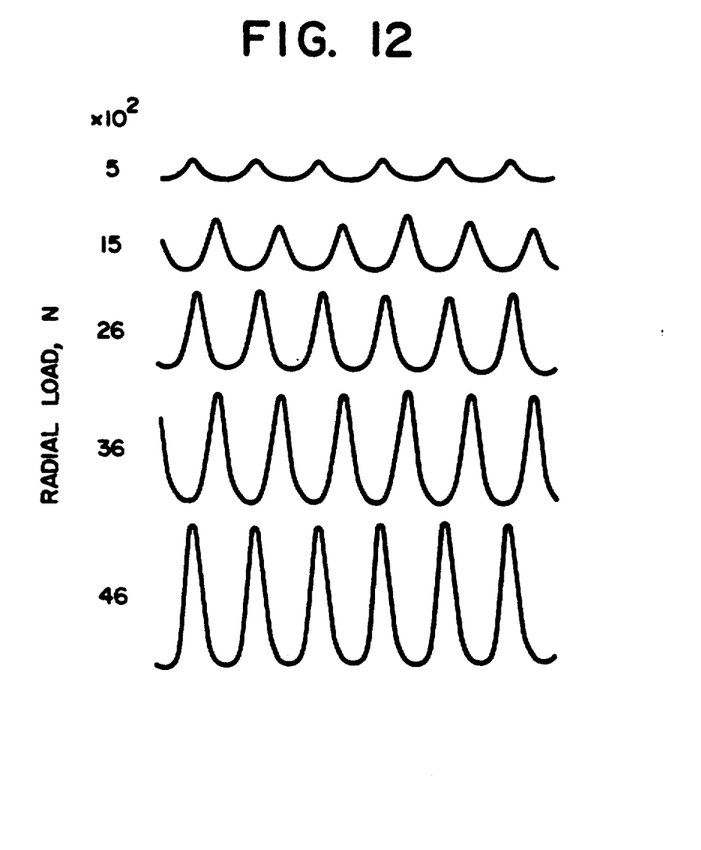
FIG. 12 is a graph showing a relationship between a radial load applied to the rolling bearing and an output wave-form of the strain gauge.

FIG. 12 shows an experimental result about a load-output waveform relationship when the rotational speed of an inner ring of the bearing was kept constant at 1000 rpm and a radial load applied to the outer ring was changed in five stages in a range of $5 \times 10^2$ to $46 \times 10^2$N. In this case, the direct current component and high frequency component over 300 Hz of the first output signal A was cut with the band-pass filter 21. As shown in FIG. 12, the output signal peaked whenever the ball passed near the strain gauges $7_1$ and $7_2$.

Figure 13:
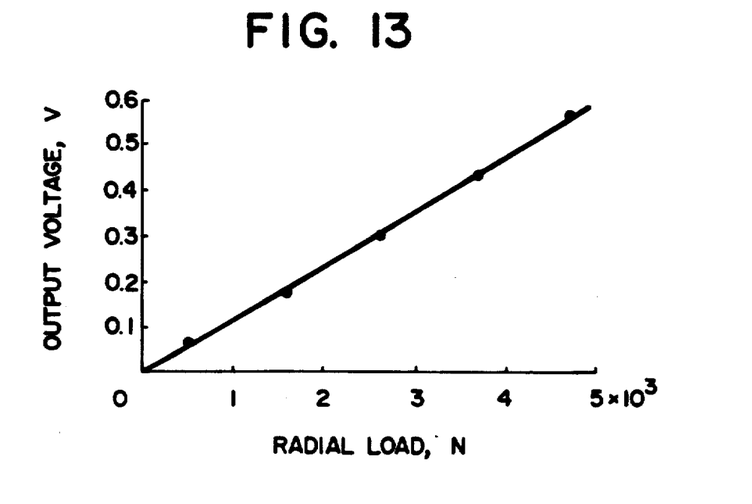
FIG. 13 is a graph showing a relationship between the radial load and an output voltage from the strain gauge, which is obtained from the graph in FIG. 12.

FIG. 13 is a graph showing a relationship that was obtained by plotting the output voltage A relative to the radial load in the experimental result shown in FIG. 12. The relationship is substantially linear.

Figure 14:
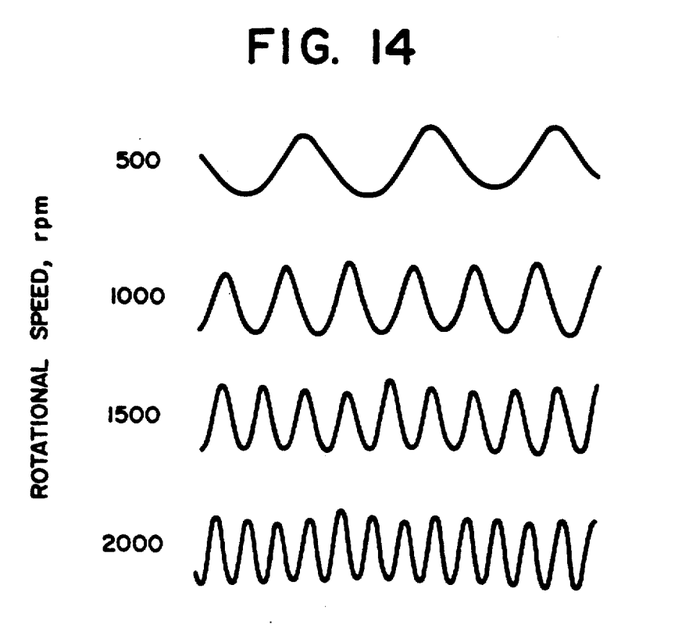
FIG. 14 is a graph showing a relationship between the rotational speed of a rolling ring of the rolling bearing and an output waveform of the strain gauge.
Figure 15:
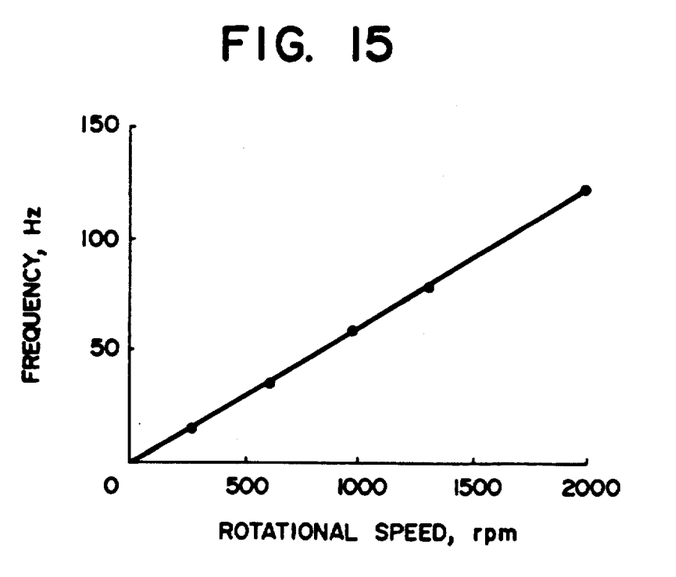
FIG. 15 is a graph showing a relationship between the rotational frequency of the rolling ring and an output voltage from the strain gauge, which is obtained from the graph in FIG. 14.

FIG. 14 shows an experimental result about a rotational speed-output waveform relationship when the radial load was kept constant at $15 \times 10^2$N and the rotational speed of the inner ring was changed in four stages in a range of 500 to 2000 rpm, wherein the direct current component and high frequency component over 300 Hz of the output signal A was cut with a band-pass filter 21. From this experimental result the relationship between the frequency of the output signal A and the rotational speed was obtained as shown in FIG. 15. The relationship is substantially linear. Further, the rotational acceleration of the inner ring was determined by differentiating the output signal from the frequency-detecting circuit 14 with the differentiating circuit 15.

Figure 16:
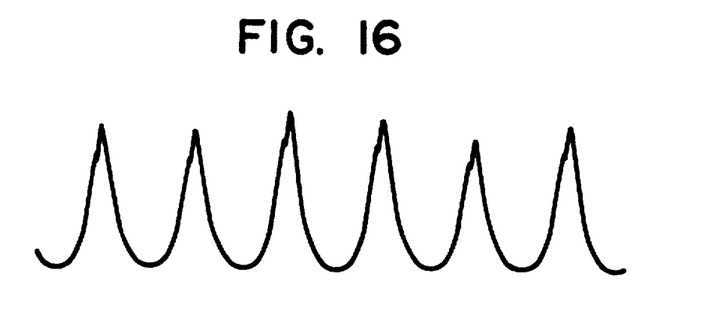
FIG. 16 is a graph showing an output waveform from the strain gauge when the raceway track of fixed ring of the rolling bearing is undesirably flaked.
Figure 17:
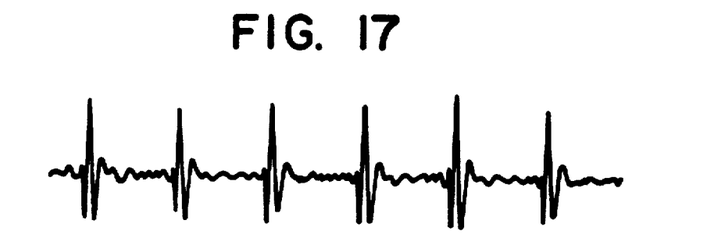
FIG. 17 is a graph showing a waveform which is obtained by treating the output signal in FIG. 16 with a band-pass filter and amplifying the signal passed through the filter.

FIG. 16 shows a disordered waveform of the output signal A when the raceway track of the bearing was partially undesirably flaked and the inner ring was rotated at 1000 rpm. Such disorder in waveform was enlarged, as shown in FIG. 17, by cutting the high frequency components below 300 Hz and over 2 kHz of the output signal A with the band-pass filter 16. It has been found that the above disordered waveform is caused when the balls run on the flaked portion of the raceway track.

Figure 18:
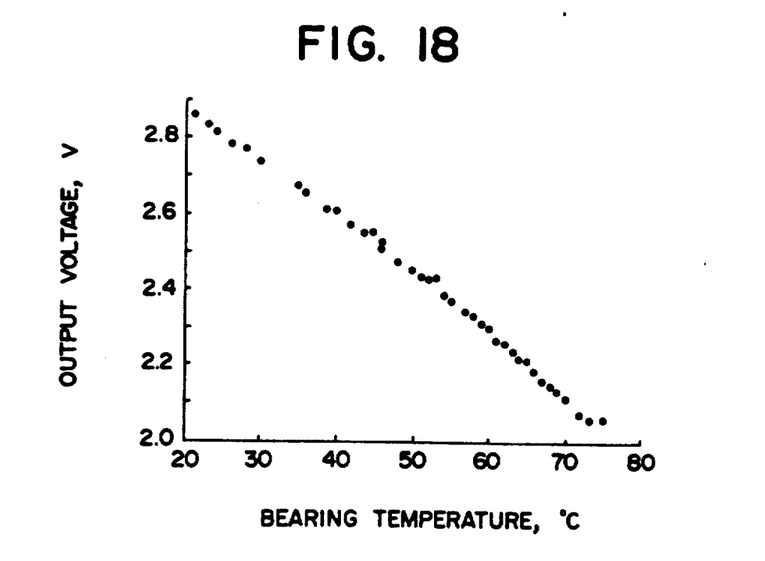
FIG. 18 is a graph showing a relationship between the temperature of the fixed ring and a temperature drift voltage from the strain gauge.

FIG. 18 is a graph of the relationship between the second output voltage B from the bridge circuit and the temperature of the rolling bearing.

What is claimed is:

1. A rolling bearing comprising:
   a rolling ring;
   a fixed ring disposed to coaxially radially overlap the rolling ring with an annular space therebetween;
   rolling elements rotatably inserted in to the annular space between the rolling ring and the fixed ring;
   a sensor unit disposed on one of the opposite circumferential surfaces of the fixed ring and comprising first and second strain gauges which are fixedly provided on said one of the opposite circumferential surfaces of the fixed ring and which are arranged to extend, respectively, along the circumferential direction of and the axial direction of the fixed ring; and
   detecting means electrically connected to the first and second strain gauges for detecting a plurality of performance characteristics of the rolling bearing from output signals of the first and second strain gauges, said detecting means comprising (a) a bridge circuit including first, second, third and fourth arms, with the first and second arms being mutually adjacent and composed of the first and second strain gauges, respectively, with the third and fourth arms being mutually adjacent and composed of first and second resistors, respectively, and with the third and first arms being mutually adjacent said bridge circuit having first and second input terminals connected to the first and second strain gauges and to the first and second resistors, respectively, and having first and second output terminals connected to the first strain gauge and the first resistor and to the second strain gauge and the second resistor, respectively, said first and second input terminals being connected to first and second output terminals of a voltage source, respectively; (b) a first means for sensing a peak-to-peak amplitude of a first output signal formed between the first and second output terminals of the bridge circuit; (c) a second means for sensing the frequency of the first output signal from the bridge circuit; (d) a third means for sensing a rate of change of the frequency sensed by the second means; (e) a fourth means for sensing the level of high frequency component of the first output signal from the bridge circuit; and (f) a fifth means for sensing the level of a second output signal formed between said first input terminal and said second output terminal.

2. The rolling bearing according to claim 1, wherein the first and second strain gauges are arranged to overlap each other.

3. The rolling bearing according to claim 2, wherein the first and second strain gauges cross at right angles to each other.

4. The rolling bearing according to claim 2, wherein the first and second strain gauges cross obliquely to each other.

5. The rolling bearing according to claim 1, wherein the first and second strain gauges are embedded in or pasted on a portion of the circumferential surface, with a raceway track for the rolling elements, of the fixed ring, the surface portion being positioned apart from the raceway track.

6. The rolling bearing according to claim 1, wherein the first and second strain gauges are embedded in or pasted on a notched portion formed in the circumferential surface, with a raceway track for the rolling elements, of the fixed ring, the notched portion being positioned apart from the raceway track.

7. The rolling bearing according to claim 5, wherein the first and second strain gauges are disposed on a first insulating layer formed on the circumferential surface of the fixed ring and covered with a second insulating layer.

8. The rolling bearing according to claim 7, wherein the second insulating layer is covered with a protecting layer.

9. The rolling bearing according to claim 6, wherein the first and second strain gauges are disposed on a first insulating layer formed on the notched portion and covered with a second insulating layer.

10. The rolling bearing according to claim 9, wherein the second insulating layer is covered with a protecting layer.

11. A rolling bearing comprising:
a rolling ring;
a fixed ring disposed to coaxially radially overlap the rolling ring with an annular space therebetween;
rolling elements rotatably inserted into the annular space between the rolling ring and the fixed ring; and
a sensor unit disposed on a circumferential surface, without a raceway track for the rolling elements, of the fixed ring and comprising first and second strain gauges provided on the circumferential surface of the fixed ring and a plug socket connected with the respective two leaders of the first and second strain gauges, said first and second strain gauges being arranged to extend, respectively, along the circumferential direction of and the axial direction of the fixed ring; and
detecting means electrically connected to the plug socket for detecting, through the plug socket, a plurality of performance characteristics of the rolling bearing from output signals of the first and second strain gauges, said detecting means comprising (a) a bridge circuit including first, second, third and fourth arms, with the first and second arms being mutually adjacent and composed of the first and second strain gauges, respectively, and with the third and fourth arms being mutually adjacent and composed of first and second resistors, respectively, and with the third and first arms being mutually adjacent said bridge circuit having first and second input terminals connected to the first and second strain gauges and to the first and second resistors, respectively, and having first and second output terminals connected to the first strain gauge and the first resistor and to the second strain gauge and the second resistor, respectively, said first and second input terminals being connected to first and second output terminals of a voltage source, respectively; (b) a first means for sensing a peak-to-peak amplitude of a first output signal formed between the first and second output terminals of the bridge circuit; (c) a second means for sensing the frequency of the first output signal from the bridge circuit; (d) a third means for sensing a rate of change of the frequency sensed by the second means; (e) a fourth means for sensing the level of high frequency component of the first output signal from the bridge circuit; and (f) a fifth means for sensing the level of a second output signal formed between said first input terminal and said second output terminal.

12. The rolling bearing according to claim 11, wherein the first and second strain gauges are arranged to overlap each other.

13. The rolling bearing according to claim 12, wherein the first and second strain gauges cross at right angles to each other.

14. The rolling bearing according to claim 12, wherein the first and second strain gauges cross obliquely to each other.

15. The rolling bearing according to claim 11, wherein the sensor unit is disposed on a notched portion formed in the circumferential surface without the raceway track of the fixed ring, and the first and second strain gauges are embedded in or pasted on the notched portion and arranged to overlap each other.

16. The rolling bearing according to claim 15, wherein the first and second strain gauges cross at right angles to each other.

17. The rolling bearing according to claim 15, wherein the first and second strain gauges cross obliquely to each other.

18. The rolling bearing according to claim 11, wherein the sensor unit is disposed on a notched portion formed in the circumferential surface without the raceway track of the fixed ring; the first and second strain gauges are arranged to extend without their overlapping on the notched portion; and the respective two leaders from the first and second strain gauges are lined up in four rows in a direction and connected with the plug socket.

19. The rolling bearing according to claim 1, wherein the first and second strain gauges are arranged to extend without their overlapping in a region, in which the mechanical influence of rotation of the rolling ring on the fixed ring is substantially uniform, of the circumferential surface of the fixed ring.

20. The rolling bearing according to claim 19, wherein the first and second strain gauges extend at right angles to each other.

21. The rolling bearing according to claim 19, wherein the first and second strain gauges extend obliquely to each other.

22. The rolling bearing according to claim 1, wherein the first and second strain gauges are embedded in or pasted on the circumferential surface, without a raceway track for the rolling elements, of the fixed ring.

23. The rolling bearing according to claim 1, wherein the first and second strain gauges are embedded in or pasted on a notched portion formed in the circumferential surface, without a raceway track for the rolling elements, of the fixed ring.

24. The rolling bearing according to claim 23, wherein the notched portion is formed in one of the opposite edges of the circumferential surface of the fixed ring.

25. The rolling bearing according to claim 23, wherein the first and second strain gauges are disposed on a first insulating layer formed on the notched portion and covered with a second insulating layer.

26. The rolling bearing according to claim 25, wherein the second insulating layer is covered with a protecting layer.

27. The rolling bearing according to claim 11, wherein the first and second strain gauges are arranged to extend without their overlapping in a region, in which the mechanical influence of rotation of the rolling ring on the fixed ring is substantially uniform, of the circumferential surface of the fixed ring.

28. The rolling bearing according to claim 27, wherein the first and second strain gauges extend at right angles to each other.

29. The rolling bearing according to claim 27, wherein the first and second strain gauges extend obliquely to each other.

30. The rolling bearing according to claim 11, wherein the first and second strain gauges are disposed on a first insulating layer formed on the circumferential surface of the fixed ring and covered with a second insulating layer.

31. The rolling bearing according to claim 30, wherein the second insulating layer is covered with a protecting layer.

32. The rolling bearing according to claim 11, wherein the sensor unit is disposed on a notched portion formed in the circumferential surface without the raceway track of the fixed ring, and the first and second strain gauges are embedded in or pasted on the notched portion.

33. The rolling bearing according to claim 32, wherein the first and second strain gauges are arranged to extend without their overlapping on the notched portion.

34. The rolling bearing according to claim 33, wherein the first and second strain gauges extend at right angles to each other.

35. The rolling bearing according to claim 33, wherein the first and second strain gauges extend obliquely to each other.

36. A performance detector for a rolling bearing, comprising:
    detecting means for detecting performance characteristics of a rolling bearing and generating output signals in response thereto, the detecting means comprising a bridge circuit including first, second, third and fourth arms, the first and second arms being mutually adjacent and composed of first and second strain gauges, respectively, disposable on the rolling bearing, the third and fourth arms being mutually adjacent and composed of first and second resistors respectively, end with the third and first arms being mutually adjacent the bridge circuit having first and second input terminals, connectable to a voltage source, and connected to the first and second strain gauges and to the first and second resistors, respectively, and having first and second output terminals connected to the first strain gauge and the first resistor and to the second strain gauge and the second resistor, respectively; and
    determining means responsive to the output signals from the detecting means for determining the performance characteristics of the rolling bearing, the determining means including at least one of first means for sensing a peak-to-peak amplitude of a first output signal formed between the first and second output terminals of the bridge circuit, second means for sensing the frequency of the first output signal, third means for sensing a rate of change of the frequency sensed by the second means, fourth means for sensing a level of high frequency component of the first output signal, and fifth means for sensing a level of a second output signal formed between said first input terminal and said second output terminal.

37. The performance detector for a rolling bearing, according to claim 36; wherein the first and second strain gauges are arranged to overlap each other.

38. The performance detector for a rolling bearing, according to claim 36; wherein the first and second strain gauges cross at right angles to each other.

39. The performance detector for a rolling bearing, according to claim 36; wherein the first and second strain gauges cross obliquely to each other.

40. A performance detector for a rolling bearing according to claim 36; wherein the first and second strain gauges have two leaders respectively; and further comprising a plug socket connectable with the respective two leaders of the first and second strain gauges wherein the detecting means is electrically connectable to the first and second strain-gauges through the plug socket.

41. The rolling bearing according to claim 1, wherein the first and second strain gauges are disposed on a first insulating layer formed on the circumferential surface of the fixed ring and covered with a second insulating layer.

42. The rolling bearing according to claim 41, wherein the second insulating layer is covered with a protecting layer.

43. The rolling bearing according to claim 33, wherein the notched portion is positioned in one of the opposite edges, outside the raceway track, of the circumferential surface of the fixed ring.

44. The rolling bearing according to claim 43, wherein the first and second strain gauges are disposed on a first insulating layer formed in or on the notched portion and covered with a second insulating layer.

45. The rolling bearing according to claim 44, wherein the second insulating layer is covered with a protecting layer.

* * * * *